(12) United States Patent
Van Grinsven et al.

(10) Patent No.: US 7,655,205 B2
(45) Date of Patent: Feb. 2, 2010

(54) PROCESS FOR THE REMOVAL OF $SO_2$, HCN AND $H_2S$ AND OPTIONALLY COS, $CS_2$ AND $NH_3$ FROM A GAS STREAM

(75) Inventors: Petrus Franciscus Antonius Van Grinsven, Voorschoten (NL); Wiebe Sjoerd Kijlstra, Amsterdam (NL); Inge Roos, Amsterdam (NL); Cornelis Jacobus Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 701 days.

(21) Appl. No.: 10/558,448

(22) PCT Filed: May 28, 2004

(86) PCT No.: PCT/EP2004/050955

§ 371 (c)(1),
(2), (4) Date: Jul. 11, 2006

(87) PCT Pub. No.: WO2004/105922

PCT Pub. Date: Dec. 9, 2004

(65) Prior Publication Data

US 2006/0272502 A1 Dec. 7, 2006

(30) Foreign Application Priority Data

May 29, 2003 (EP) .................. 03253365

(51) Int. Cl.
*B01D 53/48* (2006.01)
*B01D 53/58* (2006.01)

(52) U.S. Cl. ............... 423/242.1; 423/244.01; 423/236; 423/573.1; 423/DIG. 17; 423/576.8; 423/237; 435/266

(58) Field of Classification Search ............ 423/242.1, 423/244.01, 236, 573.1, DIG. 17, 576.8, 423/237; 435/266
See application file for complete search history.

(56) References Cited

U.S. PATENT DOCUMENTS 5,976,868 A * 11/1999 Buisman .............. 435/266
6,107,353 A    8/2000 Koveal et al. ........... 518/705

(Continued)

FOREIGN PATENT DOCUMENTS

EP         0140191        5/1985

(Continued)

OTHER PUBLICATIONS

International Search Report dated Sep. 14, 2004.

(Continued)

*Primary Examiner*—Timothy C Vanoy
(74) *Attorney, Agent, or Firm*—Charles W. Stewart

(57) ABSTRACT

Disclosed is a process for the removal of sulfur from a gas stream containing sulfur dioxide, hydrogen cyanide and hydrogen sulfide. The process includes a hydrogenation step, a hydrolysis step, an ammonia removal step and a hydrogen sulfide removal step. An aqueous alkaline washing liquid is used in the hydrogen sulfide removal step and with the spent sulfide containing washing liquid being regenerated using an oxidation bioreactor that utilizes sulfide oxidizing bacteria such as autotropic aerobic cultures of *Thiobacillus* and *Thiomicrospira*.

19 Claims, 1 Drawing Sheet

U.S. PATENT DOCUMENTS 6,156,205 A 12/2000 Buisman et al. ............. 210/620
7,485,275 B2 * 2/2009 Asprion et al. ............. 423/220

FOREIGN PATENT DOCUMENTS

EP 0324526 7/1989
WO 96/19281 6/1996
WO 98/07502 2/1998

OTHER PUBLICATIONS

Intl Preliminary Examination Report (PCT/EP2004/050955) dated Sep. 6, 2005.

* cited by examiner

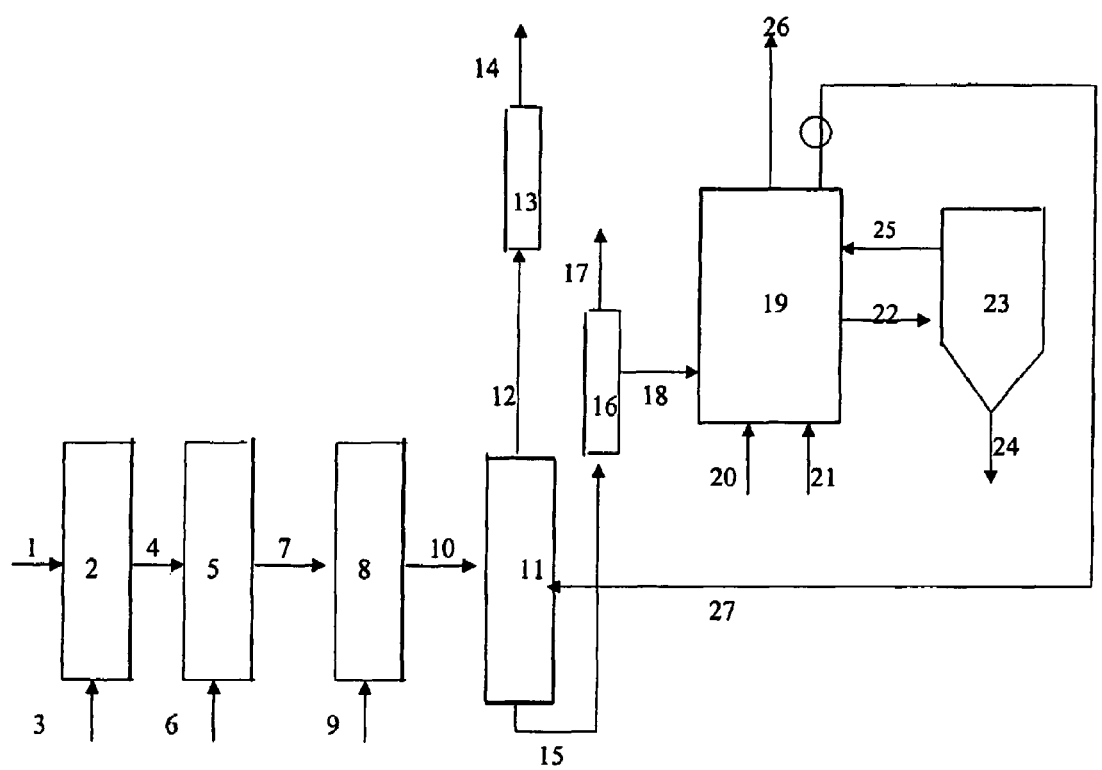

US 7,655,205 B2

PROCESS FOR THE REMOVAL OF $SO_2$, HCN AND $H_2S$ AND OPTIONALLY COS, $CS_2$ AND $NH_3$ FROM A GAS STREAM

PRIORITY CLAIM

The present application claims priority to European Patent Application No. 03253365.5 filed May 29, 2003.

The invention relates to a process for removing $SO_2$, HCN and $H_2S$ and optionally COS, $CS_2$ and $NH_3$ from a gas stream.

BACKGROUND

Gas streams from industrial chemical processes may contain a variety of sulphur compounds such as $H_2S$, $SO_2$, $CS_2$ and COS. The removal of these sulphur compounds is of considerable importance, because the toxicity and smell of sulphur compounds renders their presence highly undesirable. In addition, other compounds whose presence is undesirable may be present such as HCN or $NH_3$. It is often necessary for the intended purposes of the gas stream to remove these compounds at least partly, for example to prevent catalyst poisoning in processes after the gasification stage.

Processes for the removal of sulphur compounds are known in the art.

In EP 324,526 a process is described for the removal of $H_2S$, COS, $CS_2$ and $SO_2$ from a gas stream, by converting COS and $CS_2$ into $H_2S$. Although EP 324,526 mentions the removal of $H_2S$, it does not specify the preferred type of process for $H_2S$ removal, nor is the concentration of $H_2S$ in the treated gas stream mentioned.

A process known in the art for the removal of $H_2S$ from a gas stream is the partial oxidation of $H_2S$ to $SO_2$ according to:

Partial $H_2S$ oxidation $2H_2S+3O_2 \rightarrow 2H_2O+2SO_2$ (1)

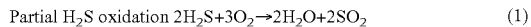

The $SO_2$ formed can be (catalytically) converted to elemental sulphur according to the Claus reaction:

Claus reaction $4H_2S+2SO_2 \leftrightarrows 4H_2O+3S_2$ (2)

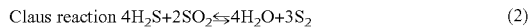

This process is known as the Claus process. The Claus process is frequently employed both in refineries and for the processing of $H_2S$ recovered from natural gas.

A disadvantage of the Claus process is that it is thermodynamically limited by the increase of the water vapour content and simultaneously by the decrease of the $H_2S$ and $SO_2$ concentration as the $H_2S$ conversion proceeds, with the result that the equilibrium of the Claus reaction shifts to the left. Since the dew point of water lies below the solidification point of sulphur, condensation of the water vapour in the process gas to remove this limitation can lead to serious problems, such as clogging due to the solidification of sulphur and corrosion due to the formation of sulfuric acid, causing serious operational problems.

At relatively low concentrations of $H_2S$, typically concentrations below 20 vol %, the Claus process is difficult to operate and requires special technical provisions.

Another disadvantage of the Claus process is that the concentration of $H_2S$ in the treated gas is still relatively high. The Claus process has been improved to an extent where the $H_2S$ content of the treated gas can be lowered to approximately 1 vol % (Superclaus-99 process) and the $SO_2$ content to approximately 0.02 vol %. However, especially in the case where it is necessary to comply with requirements with regard to residential use or environmental regulations with respect to emission of sulphur compounds, even lower concentrations of $H_2S$ and $SO_2$, in the ppm range, have to be achieved. A disadvantage of the Claus and Superclaus process is that such low concentrations of $H_2S$ and $SO_2$ cannot be achieved.

The removal of HCN from gas streams is important not only because of its own toxic properties, but also in view of corrosive $NO_X$-compounds which can evolve when both HCN and oxygen are present in a gas stream. In addition, HCN itself is corrosive to equipment when allowed to concentrate in liquid streams upon gas treating.

SUMMARY OF THE INVENTION

We have now found a relatively simple and inexpensive process for removing $SO_2$, $H_2S$ and HCN and optionally COS, $CS_2$ and $NH_3$ from a gas stream. In the process according to the invention, a combination of reaction steps is used to achieve the removal of sulphur compounds such as $H_2S$ and $SO_2$, and optionally also COS and/or $CS_2$, as well as HCN from a gas stream comprising these compounds, to concentrations of below 10 ppmv for $H_2S$, below 100 ppmv for $SO_2$ and below 0.01 vol %, preferably 10 ppmv for HCN.

The invention relates to a process for the removal of $SO_2$, HCN and $H_2S$ and optionally one or more compounds from the group of COS, $CS_2$ and $NH_3$ from a first gas stream, which process comprises the steps of:

(a) removing $SO_2$ from the first gas stream by contacting the first gas stream in a hydrogenation zone with a hydrogenation catalyst in the presence of hydrogen to obtain a second gas stream;

(b) removing HCN and optionally COS and/or $CS_2$ from the second gas stream obtained in step (a) by contacting the second gas stream in a hydrolysis zone with a hydrolysis catalyst in the presence of water to obtain a third gas stream;

(c) removing $NH_3$ from the third gas stream by contacting the third gas stream in a $NH_3$-removal zone with an aqueous (acidic) washing liquid to obtain an ammonium-comprising aqueous stream and a fourth gas stream;

(d) removing $H_2S$ from the fourth gas stream by contacting the fourth gas stream in a $H_2S$-removal zone with an aqueous alkaline washing liquid to obtain a $H_2S$-depleted gas stream and a hydrogen-sulphide-comprising aqueous stream;

(e) contacting the hydrogen-sulphide-comprising aqueous stream obtained in step (d) with sulphide-oxidizing bacteria in the presence of oxygen in a oxidation reactor to obtain a sulphur slurry and a regenerated aqueous alkaline washing liquid;

(f) separating at least part of the sulphur slurry obtained in step (e) from the regenerated aqueous alkaline washing liquid and;

(g) recycling regenerated aqueous alkaline washing liquid obtained in step (e) to the $H_2S$-removal zone in step (d).

BRIEF DESCRIPTION OF THE DRAWING

FIG. 1 is a schematic representation of one embodiment of the inventive process.

DETAILED DESCRIPTION OF THE INVENTION

In step (a) of the process according to the invention, $SO_2$ is removed from the first gas stream by contacting the first gas stream in a hydrogenation zone with a hydrogenation catalyst in the presence of hydrogen to obtain a second gas stream. In the hydrogenation zone, $SO_2$ is converted to $H_2S$ according to reaction (3):

Hydrogenation reaction $SO_2+3H_2 \rightarrow H_2S+2H_2O$ (3)

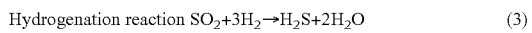

Reference herein to a first gas stream is to a gas stream comprising $H_2S$, $SO_2$, HCN and optionally one or more compounds selected from the group of COS, $CS_2$ and $NH_3$. The process is especially suitable for first gas streams having a total concentration of sulphur compounds, especially a total concentration of $H_2S$, of between 10 ppmv and 30 vol %, preferably between 100 ppmv and 20 vol %, based on the total gas stream. At these relatively low concentrations of sulphur, especially of $H_2S$, conventional processes such as the Claus process cannot be operated without additional technical provisions, for example amine treatment, to concentrate the $H_2S$ content, whereas the process according to the invention can be operated without the need for additional technical provisions. Typically, the amount of $H_2S$ in the first gas stream is at least 50% of the sulphur compounds, preferably 80%, more preferably 90%.

Usually, the total concentration of HCN in the first gas stream is typically between 10 and 5000 ppmv, suitably between 20 and 1000 ppmv, or between 40 and 250 ppmv, based on the total gas stream.

Optionally, solid compounds present in the first gas stream can be removed from the first gas stream prior to entering the hydrogenation zone, for example by use of a filter. This results in less contamination of the sulphur product in step (e) of the process.

The hydrogenation zone can be a gas/solid contactor, preferably a fixed bed reactor. Suitable hydrogenation catalysts are for example cobalt/molybdenum, cobalt/tungsten or nickel/molybdenum catalysts. The hydrogenation catalysts suitable for the process according to the invention can be supported, preferably on a refractory oxide support, more preferably on an alumina support.

Suitably, the temperature in the hydrogenation zone is between 200° C. and 380° C., preferably between 210° C. and 360° C., more preferably between 250° C. and 350° C., still more preferably between 280 and 330° C. It is found that the hydrogenation reaction proceeds at favourable rates at these temperature ranges. At a temperature range of between 280 and 330° C., the highest reduction of $SO_2$ is achieved. The pressure in the hydrogenation zone is suitably between 1 and 100 bara, preferably between 2 and 80 bara.

The hydrogenation reaction results in the second gas stream having a concentration of $SO_2$ below 100 ppmv, preferably between 0.001 ppmv and 100 ppmv, more preferably between 0.01 ppmv and 50 ppmv, suitably between 0.1 ppmv and 15 ppmv, especially between 0.5 ppmv and 10 ppmv, based on the total gas stream.

In step (b) of the process according to the invention, HCN and optionally COS and/or $CS_2$ are removed from the second gas stream obtained in step (a) by contacting the second gas stream in a hydrolysis zone with a hydrolysis catalyst to obtain a third gas stream.

In the hydrolysis zone, HCN and, if applicable, COS and/or $CS_2$ are converted according to the following reactions:

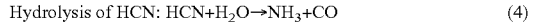

Hydrolysis of HCN: $HCN + H_2O \rightarrow NH_3 + CO$  (4)

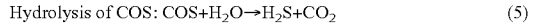

Hydrolysis of COS: $COS + H_2O \rightarrow H_2S + CO_2$  (5)

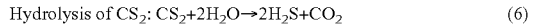

Hydrolysis of $CS_2$: $CS_2 + 2H_2O \rightarrow 2H_2S + CO_2$  (6)

The amount of water/steam in the hydrolysis zone is preferably between 10 v/v % and 80 v/v %, more preferably between 20 v/v % and 70 v/v %, still more preferably between 30 v/v % and 50 v/v %, based on steam. At the preferred water/steam amounts, the conversion of HCN and optionally COS and/or $CS_2$ is better. Typically, the amount of $H_2O$ in the gas stream is sufficient to achieve conversion of HCN optionally COS and/or $CS_2$. Optionally, water or steam of a mixture thereof may be added to the second gas stream prior to contacting the second gas stream with the hydrogenation catalyst, in order to achieve the desired water/steam amount. Optionally, the reaction conditions are selected in such a way, that the reaction mixture remains below the dewpoint of $H_2O$. The $H_2O$ in the gas stream can then advantageously be used for the conversion of HCN and optionally COS and/or $CS_2$, to the desired levels.

If COS and/or $CS_2$ are present, the total concentration of COS and $CS_2$ in the second gas stream is suitably between 10 ppmv and 2 vol %, preferably between 20 ppmv and 1 vol %, based on the total gas stream.

The hydrolysis zone can be a gas/solid contactor, preferably a fixed bed reactor.

Catalysts for the hydrolysis of HCN and optionally COS and/or $CS_2$ are known to those skilled in the art and include for example $TiO_2$-based catalysts or catalysts based on alumina and/or chromium-oxide. Preferred catalysts are $TiO_2$-based catalysts.

Optionally, the hydrolysis step can be done prior to the hydrogenation step. A disadvantage of performing the hydrogenation step prior to the hydrolysis step is that when a $TiO_2$ catalyst is used, the $TiO_2$ catalyst can also catalyze the Claus reaction, leading to the formation of sulphur from $H_2S$ and $SO_2$. However, in the case where the temperature is above the dew point of sulphur, the formation of sulphur from the Claus reaction does not lead to clogging.

The hydrolysis results in a third gas stream having a concentration of HCN below 0.01 vol %, suitably between 0.1 ppmv and 0.01 vol %, preferably between 1 ppmv and 50 ppmv, based on the total gas stream.

The concentration of COS, if present, in the third gas stream is below 0.01 vol %, suitably between 10 ppmv and 0.01 vol %, preferably between 15 ppmv and 100 ppmv, based on the total gas stream.

The concentration of $CS_2$, if present, in the third gas stream is below 0.01 vol %, suitably between 1 ppmv and 0.01 vol %, preferably between 2 ppmv and 50 ppmv, based on the total gas stream.

In step (c) of the process according to the invention $NH_3$ is removed from the third gas stream by contacting the third gas stream in an $NH_3$-removal zone with an aqueous (acidic) washing liquid to obtain an ammonium-comprising aqueous stream and a fourth gas stream. The process is especially suitable for a third gas stream having an amount of $NH_3$ of between 10 and 6000 ppmv, preferably between 20 and 2000 ppmv. The temperature in the $NH_3$-removal zone is suitably between 5 and 70° C., preferably between 10 and 50° C., to achieve a sufficient removal of $NH_3$ at a low temperature. The pressure in the $NH_3$-removal zone is suitably between 1 and 100 bara, preferably between 2 and 80 bara, to achieve a sufficient removal of $NH_3$ at a low pressure.

In step (d) of the process according to the invention $H_2S$ is removed from the fourth gas stream by contacting the fourth gas stream in $H_2S$-removal zone with an aqueous alkaline washing liquid to obtain a $H_2S$-depleted gas stream and a hydrogen-sulphide-comprising aqueous stream.

The process is especially suitable if the load of sulphur compounds in the. $H_2S$-removal zone is below 60000 kg/day, suitably between 50 and 50000 kg/day, preferably between 75 and 20000 kg/day, more preferably between 100 and 10000 kg/day. At these sulphur loads, conventional processes such as the Claus process are difficult, if not impossible, to operate, whereas the process according to the invention can be used advantageously.

Suitably, the total amount of $H_2S$ of the fourth gas stream is between 10 ppmv and 20 vol %, preferably between 20 ppmv and 10 vol %. An advantage of the process according to the invention is that the $H_2S$ in the fourth gas stream can be removed even when the $H_2S$ amount is relatively low, typically between 10 ppmv and 20 vol %. For other processes such as the Claus process it is necessary that a sour gas is produced that has a high $H_2S$ content to make it suitable as a Claus feed, for example by an amine treatment and regeneration step prior to the Claus reaction.

Suitable aqueous washing liquids include aqueous hydroxide solutions, e.g. sodium hydroxide or potassium hydroxide solutions in water. The pH of the aqueous alkaline solvents is suitably between 7 and 12, preferably between 8 and 11.

The main reactions that can take place in the $H_2S$-removal zone in step (d) are:

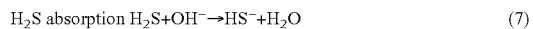

$H_2S$ absorption $H_2S + OH^- \rightarrow HS^- + H_2O$ (7)

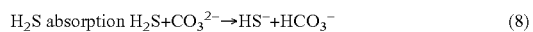

$H_2S$ absorption $H_2S + CO_3^{2-} \rightarrow HS^- + HCO_3^-$ (8)

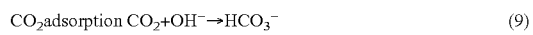

$CO_2$ adsorption $CO_2 + OH^- \rightarrow HCO_3^-$ (9)

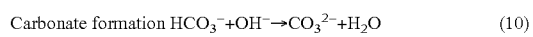

Carbonate formation $HCO_3^- + OH^- \rightarrow CO_3^{2-} + H_2O$ (10)

Poly-hydrosulphide $2HS^- + S_8 \rightarrow 2HS_5^-$ (11)

Formation

The term sulphide-comprising aqueous stream as used herein refers to an aqueous stream comprising one or more products of the main reactions (7) to (11) that can take place in the $H_2S$-removal zone, such as $HS^-$, disulphides, polysulphides, thiocarbonates and carbonates but can also include dissolved $H_2S$.

The preferred temperature in the $H_2S$ removal zone is between 5 and 70° C., more preferably between 10 and 50° C. Preferably, the pressure in the $H_2S$ removal zone is between 1 and 100 bara, more preferably between 2 and 80 bara.

Typically, the $H_2S$ removal zone is a gas/liquid contactor. Suitable gas/liquid contactors are described in Perry's Chemical Engineers' Handbook, $7^{th}$ edition, section 14 (1997) and include for example a tray or packed column or a gas scrubber.

Optionally, the medium of the $H_2S$ removal zone is buffered. Preferred buffering compounds are carbonates, bicarbonates phosphates and mixtures thereof, especially sodium carbonate and/or sodium bicarbonate. The concentration of the buffering compounds depends inter alia on the composition of the gas flow and is generally adjusted in such a way, that the pH of the reaction medium in the $H_2S$ removal zone is between 6.0 and 10, more preferably between 6.5 and 9.0.

Optionally, fresh alkaline washing liquid can be supplied to the $H_2S$ removal zone to achieve the desired pH.

Due to their odorous nature, $H_2S$, mercaptans, sulphides, disulphides and aromatic mercaptans can be detected at parts per million concentrations. Thus, it is desirable for users of such gas and refinery streams to have total concentration of sulphur compounds, especially $H_2S$, lowered to a concentration of e.g. less than 30 or 20 ppmv, preferably less than 10 ppmv, based on the total $H_2S$-depleted gas stream.

The process results in a "$H_2S$-depleted gas stream" having a total concentration of sulphur compounds, especially $H_2S$, of below 35 ppmv, suitably between 0.01 and 30 ppmv, or below 25 ppmv, suitably between 0.01 and 20 ppmv, or below 15 ppmv, suitably between 0.01 and 10 ppmv, preferably between 0.05 and 3.5 ppmv, more preferably between 0.1 and 1 ppmv, based on the total gas stream.

In step (e) of the process according to the invention the hydrogen-sulphide-comprising aqueous stream obtained in step (d) is contacted with sulphide-oxidizing bacteria in the presence of oxygen in a oxidation reactor to obtain a sulphur slurry and a regenerated aqueous alkaline washing liquid. The main reaction that can take place in the oxidation reactor in step (e) is the microbiological formation of sulphur and sulphate:

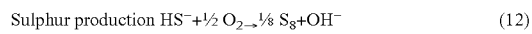

Sulphur production $HS^- + \frac{1}{2} O_2 \rightarrow \frac{1}{8} S_8 + OH^-$ (12)

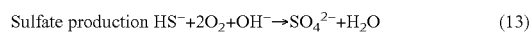

Sulfate production $HS^- + 2O_2 + OH^- \rightarrow SO_4^{2-} + H_2O$ (13)

The term sulphur slurry as used herein refers to a slurry comprising one or more products of the main reactions, including reactions (12) and (13), that can take place in the oxidation reactor.

The term regenerated aqueous alkaline solvent as used herein refers to an aqueous alkaline solvent wherein at most 2 w/w % sulphur particles are present, preferably at most 1 w/w %.

The amount of oxygen fed into the oxidation reactor is adjusted such that the oxidation of absorbed sulphide results predominantly in sulphur, as suggested in NL 8801009, disclosing a process for the controlled oxidation of sulphur-containing waste water.

Reference herein to sulphide-oxidizing bacteria is to bacteria which can oxidize sulphide to elemental sulphur. Suitable sulphide-oxidizing bacteria can be selected for instance from the known auto tropic aerobic cultures of the genera Thiobacillus and Thiomicrospira.

Typical pressures in the oxidation reactor in step (e) are between 1 and 2 bara.

Suitably, the oxidation reactor has a volume of between 5 and 2500 $m^3$, preferably between 10 and 2000 $m^3$.

Preferably, the reaction medium in the oxidation reactor in step (e) is buffered. The buffering compounds are chosen in such a way that the bacteria present in the oxidation reactor tolerate them. Preferred buffering compounds are carbonates, bicarbonates phosphates and mixtures thereof, especially sodium carbonate and/or sodium bicarbonate. The concentration of the buffering compounds depends inter alia on the composition of the gas flow and is generally adjusted in such a way, that the pH of the reaction medium in the oxidation reactor is between 6 and 10, more preferably between 7 and 9.

In step (f) of the process according to the invention at least part, typically between 5 and 95 w/w %, preferably between 10 and 90 w/w % based on the total weight of the slurry, of the sulphur slurry obtained in step (e) is separated from the regenerated aqueous alkaline solvent. The phrase "at least part of" as used herein also includes a complete separation of sulphur from the regenerated aqueous alkaline liquid.

Suitably, the separating step takes place in a solid/liquid separator. Suitable solid/liquid separators are described in Perry's Chemical Engineers' Handbook, $7^{th}$ edition, section 22 (1997).

Typically, the sulphur content of the separated aqueous sulphur slurry is between 5 w/w % and 50 w/w %, based on the slurry. Typically, the water of the sulphur slurry is removed to an extent that a sulphur cake with a dry solids content of between 55 and 70% is obtained. Typically, the sulphur content of the sulphur cake is between 90 and 98 w/w %, based on the total weight of the sulphur cake. Optionally, the sulphur slurry obtained in step (c) can be re-slurried, filtered and dried to obtain a sulphur paste with a purity of at least 95 wt % sulphur, preferably at least 99 wt % sulphur. The sulphur paste thus-obtained can optionally be dried to produce a powder with a dry weight content of at least 85%, preferably at least 90%. This powder can suitably be applied as a fungicide or as a miticide.

The sulphur produced in the process according to the invention has a hydrophilic nature and does not cause the fouling problems that are typically caused by sulphur produced by non-biological liquid processes. Another advantage of the sulphur produced in the process according to the invention is that it is very suitable for use as a fertilizer.

In step (g) of the process according to the invention, regenerated aqueous alkaline washing liquid obtained in step (e) is recycled to the $H_2$-removal zone in step (d). Suitably, between 10 and 99%, preferably between 30 and 95%, more preferably between 40 and 90% of the total amount of regenerated aqueous alkaline washing liquid obtained in step (e) is recycled to the $H_2S$-removal zone in step (d). By recycling the regenerated aqueous washing liquid to the $H_2S$-removal zone fresh aqueous washing liquid is supplied to the $H_2S$-removal zone for the removal of $H_2S$. This enhances the removal of $H_2S$ to a concentration of 30 ppmv or less, suitably 20 ppmv or less, preferably 10 ppmv or less. The regenerated aqueous alkaline washing liquid optionally comprises sulphur particles.

The process according to the invention is especially suitable for the treatment of a gaseous CO-containing stream, especially a syngas stream, an offgas stream from a carbon black plant, or a refinery gas stream. Syngas is a general term that is applied to mixtures of carbon monoxide, hydrogen, inert components and, carbon dioxide that are derived from the gasification of coal, oil residues, waste or biomass. The main components of syngas are hydrogen and carbon monoxide. Further, often carbon dioxide and traces of methane are present. Refinery streams concern crude oil derived gaseous streams containing smaller or larger amounts of sulphur compounds. Recycle streams and bleed streams of hydrotreatment processes, especially hydrodesulfurisation processes, can also suitably be treated by the process according to the invention.

The invention will now be illustrated by means of schematic FIG. 1. FIG. 1 depicts a typical process scheme according to the invention, wherein a gas stream comprising $SO_2$, HCN, $H_2S$ and optionally COS, $CS_2$ and $NH_3$ enters via line (1) the hydrogenation zone (2) via line (1) and is contacted with the hydrogenation catalyst to remove the $SO_2$. Hydrogen is supplied to the hydrogenation zone via line (3). After treatment in the hydrogenation zone the second gas stream, which is $SO_2$-depleted, leaves the hydrogenation zone via line (4) and enters the hydrolysis zone (5) where it is contacted with a hydrolysis catalyst to remove HCN and optionally COS and/or $CS_2$. Optionally, steam or a steam/water mixture can be added to the hydrolysis zone via line (6). After treatment in the hydrolysis zone, the third gas stream, which is depleted of HCN, COS and/or $CS_2$, leaves the hydrolysis zone via line (7) and enters the $HN_3$-removal zone (8), where it is treated with aqueous (acidic) washing liquid to obtain an ammonium-comprising aqueous stream and a fourth gas stream. Optionally, steam or a steam/water mixture can be added to the $HN_3$-removal zone via line (9). After treatment in the $NH_3$-removal zone, the fourth gas stream, which is depleted of HCN, COS and/or $CS_2$ and $NH_3$, leaves the $HN_3$-removal zone via line (10) and enters the $H_2S$-removal zone (11), where it is contacted with an aqueous washing liquid. The $H_2S$-depleted gas stream is led from the $H_2S$-removal zone via line (12), optionally via a knockout vessel (13) and can be further processed via line (14). A sulphide-comprising aqueous stream leaves the $H_2S$-removal zone via line (15) and enters a flash vessel (16). $H_2S$-depleted excess gas is vented off from the flash vessel through line (17). In the case that flash gas contains some $H_2S$, the $H_2S$ is removed in a small flash gas contactor before further use as fuel gas. The sulphide-comprising aqueous stream is led via line (18) to the aerobic reactor (19) where the sulphide compounds are oxidized. Nutrients and air are fed to the aerobic reactor via feed lines (20) and (21). The sulphur-containing solid/liquid mixture generated in the aerobic reactor is led via line (22) to a solid/liquid separator (23) where the sulphur-slurry is separated and discharged via line (24). The liquid is led back to the bioreactor via line (25). Off-gas is vented from the aerobic reactor via line (26). The regenerated aqueous alkaline solvent is led to the $H_2S$-removal zone via line (27).

The invention will now be illustrated by the following non-limiting examples.

EXAMPLE 1 (COMPARATIVE)

A gas stream containing sulphur-compounds and HCN with concentrations as given in table 1 is heated to a temperature of 280° C. and led to a reactor filled with a stacked bed of hydrogenation catalyst and hydrolysis catalyst. The gas is cooled in a quench tower at 40° C. and treated in an amine/Claus unit to remove the $H_2S$. The concentrations of sulphur compounds and of HCN in the treated gas is given in table 1.

TABLE 1

|  | Gas to treating system (v/v %) | Gas after treating system (v/v %) |
|---|---|---|
| $H_2O$ | 6.7 | 3.2 |
| $H_2S$ | 1.9 | 0.01 |
| $SO_2$ | 0.1 | 0.05 |
| $CS_2$ | 0.09 | 0.01 |
| COS | 0.28 | 0.01 |
| HCN | 0.03 | 0.01 |
| $NH_3$ | 0.04 | 0.03 |

EXAMPLE 2 (ACCORDING TO THE INVENTION)

A first gas stream containing sulphur-compounds, $NH_3$ and HCN with concentrations as given in table 2 is heated to a temperature of 280° C. and led to a reactor filled with a stacked bed of hydrogenation catalyst and hydrolysis catalyst to create a second gas stream and subsequently a third gas stream. The third gas stream is cooled in a quench tower at 40° C. and treated in an $NH_3$-scrubber to create a fourth gas stream. The fourth gas stream is treated in a $H_2S$-removal unit to create a $H_2S$-depleted gas stream. The resulting hydrogen-sulphides are oxidised in a bioreactor. The concentrations of the sulphur-containing compounds and of the HCN in the treated gas ($H_2S$-depleted gas) are given in table 2.

TABLE 2

|  | Gas to treating system (first gas stream) (v/v %) | Gas after treating system ($H_2S$-depleted gas stream) (v/v %) |
|---|---|---|
| $H_2O$ | 40 | 6.8 |
| $H_2S$ | 0.9 | 0.0002 |
| $SO_2$ | 0.1 | 0.001 |
| $CS_2$ | 0.04 | 0.0002 |
| COS | 0.01 | 0.001 |
| HCN | 0.1 | 0.001 |
| $NH_3$ | 0.03 | 0.001 |

From the examples it is clear that with the process according to the invention a substantially lower concentration of sulphur-containing compounds, especially of $H_2S$, $SO_2$, $CS_2$ and COS is achieved, while the concentration of $NH_3$ and HCN is also lowered.

The invention claimed is:

1. A process for the removal of sulfur from a first gas stream comprising $SO_2$, HCN and $H_2S$, which said process comprises the steps of:
   (a) removing $SO_2$ from the first gas stream by contacting the first gas stream in a hydrogenation zone with a hydrogenation catalyst in the presence of hydrogen to convert $SO_2$ to $H_2S$ and to obtain a second gas stream comprising $H_2S$;
   (b) removing HCN from the second gas stream obtained in step (a) by contacting the second gas stream in a hydrolysis zone with a hydrolysis catalyst in the presence of water to convert HCN to ammonia and to obtain a third gas stream comprising $NH_3$;
   (c) removing $NH_3$ from the third gas stream by contacting the third gas stream in a $NH_3$-removal zone with an aqueous acidic washing liquid to obtain an ammonium-comprising aqueous stream and a fourth gas stream;
   (d) removing $H_2S$ from the fourth gas stream by contacting the fourth gas stream in a $H_2S$-removal zone with an aqueous alkaline washing liquid to obtain a $H_2S$-depleted gas stream and a hydrogensulphide-comprising aqueous stream;
   (e) contacting the hydrogensulphide-comprising aqueous stream obtained in step (d) with sulphide-oxidizing bacteria in the presence of oxygen in an oxidation reactor to obtain a sulphur slurry and a regenerated aqueous alkaline washing liquid;
   (f) separating at least part of the sulphur slurry obtained in step (e) from the regenerated aqueous alkaline washing liquid and;
   (g) recycling the regenerated aqueous alkaline washing liquid obtained in step (e) as the aqueous alkaline washing liquid to the $H_2S$-removal zone in step (d).

2. A process according to claim 1, wherein the sulphur-load in the $H_2S$-removal zone in step (d) is between 50 and 50000 kg/day.

3. A process according to claim 1, wherein the total concentration of sulphur compounds in the $H_2S$-depleted gas stream is below 30 ppmv.

4. A process according to claim 3, wherein the total concentration of $H_2S$ in the $H_2S$-depleted gas stream is below 30 ppmv.

5. A process according to claim 4, wherein the aqueous alkaline washing liquid in step (d) is buffered to maintain it at a pH of between 6 and 10.

6. A process according to claim 5, wherein the regenerated aqueous alkaline washing liquid of the oxidation reactor in step (e) is buffered to maintain it at a pH of between 6 and 10.

7. A process according to claim 2, wherein the oxidation reactor in step (e) has a volume of between 5 and 2500 $m^3$.

8. A process according to claim 6, wherein the sulphur slurry obtained in step (e) is re-slurried, filtered and dried to obtain a sulphur-content of at least 95 wt %.

9. A process according to claim 8, wherein water is added to the second gas stream prior to contacting it with the hydrolysis catalyst in step (b).

10. A process according to claim 9, wherein the water/steam content of the second gas stream is between 10 v/v % and 80 v/v %, based on steam %.

11. A process, comprising:
    contacting a first gas stream that comprises $SO_2$, HCN, and $H_2S$ with a hydrogenation catalyst and in the presence of hydrogen within a hydrogenation zone to thereby convert said $SO_2$ to $H_2S$ and to obtain a second gas stream, comprising $H_2S$;
    contacting said second gas stream with a hydrolysis catalyst and in the presence of water within a hydrolysis zone to obtain a third gas stream, comprising $NH_3$;
    contacting said third gas stream with an aqueous (acidic) washing liquid within an $NH_3$ removal zone to yield an ammonium-comprising aqueous stream comprising an ammonium and a fourth gas stream; and
    contacting said fourth gas stream with an aqueous alkaline washing liquid within an $H_2S$ removal zone to yield a sulfide-comprising aqueous stream, comprising $H_2S$, and an $H_2S$-depleted gas stream having an H2S concentration of less than 30 ppmv.

12. A process as recited in claim 11, further comprising:
    contacting said sulfide-comprising aqueous stream with sulfide-oxidizing bacteria and in the presence of oxygen within an oxidation reactor zone to obtain a sulfur slurry and a regenerated aqueous alkaline washing liquid;
    separating at least part of said sulfur slurry from said regenerated aqueous alkaline washing liquid; and
    recycling said regenerated aqueous alkaline washing liquid as said aqueous alkaline washing liquid to said $H_2S$ removal zone.

13. A process as recited in claim 11, wherein said first gas stream has a total concentration of sulfur compounds of between 10 ppmv and 30 vol % and a total concentration of HCN of between 10 and 5000 ppmv.

14. A process as recited in claim 13, wherein said second gas stream has a concentration of $SO_2$ below 100 ppmv.

15. A process as recited in claim 14, wherein said third gas stream has a concentration $NH_3$ of between 10 and 6000 ppmv and a concentration of HCN of below 0.01 vol % (100 ppmv).

16. A process as recited in claim 15, wherein said fourth gas stream has a total amount of $H_2S$ of between 10 ppmv and 20 vol %.

17. A process as recited in claim 16, wherein the hydrogenation zone operating conditions include an hydrogenation zone temperature between 200° C. and 380° C. and an hydrogenation zone pressure between 1 and 100 bara.

18. A process as recited in claim 17, wherein said aqueous alkaline washing liquid has a pH in the range of from 7 to 12 and includes an hydroxide solution selected from solutions of sodium hydroxide and potassium hydroxide.

19. A process as recited in claim 18, wherein said hydrogenation catalyst includes those catalysts selected from cobalt/molybdenum, cobalt/tungsten and nickel/molybdenum catalyst, and wherein said hydrolysis catalyst includes those catalysts selected from $TiO_2$ based catalysts, catalysts based on alumina, and catalysts based on chromium oxide.

* * * * *